US006567467B1

(12) United States Patent
Wu

(10) Patent No.: US 6,567,467 B1
(45) Date of Patent: May 20, 2003

(54) RECEIVER HAVING A COMPARATOR BASED DECISION FEEDBACK EQUALIZER

(75) Inventor: Qiang Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/399,937

(22) Filed: Sep. 21, 1999

(51) Int. Cl.[7] ............................................... H03H 7/30
(52) U.S. Cl. ........................................ 375/233; 375/232
(58) Field of Search ................................ 375/233, 231, 375/234, 236; 333/18, 28 R; 708/322, 323

(56) References Cited

U.S. PATENT DOCUMENTS

| | | | | |
|---|---|---|---|---|
| 5,097,482 A | * | 3/1992 | Serizawa et al. | 333/18 |
| 5,694,424 A | * | 12/1997 | Ariyavisitakul | 375/232 |
| 5,742,642 A | * | 4/1998 | Fertner | 375/233 |
| 5,748,674 A | * | 5/1998 | Lim | 375/233 |
| 5,787,118 A | * | 7/1998 | Ueda | 375/232 |
| 5,825,809 A | * | 10/1998 | Sim | 375/350 |
| 6,031,866 A | * | 2/2000 | Oler et al. | 375/219 |
| 6,370,190 B1 | * | 4/2002 | Young et al. | 341/110 |

* cited by examiner

Primary Examiner—Chi Pham
Assistant Examiner—Khanh Cong Tran
(74) Attorney, Agent, or Firm—Blakely, Sokoloff, Taylor & Zafman LLP

(57) ABSTRACT

A novel receiver having a decision feedback equalizer is disclosed. The decision feedback equalizer is equipped with a feedback section to generate a feedback signal. The feedback section includes a plurality of taps to successively delay a filtered version of an input signal of the decision feedback equalizer. The feedback section further includes a plurality of comparators, correspondingly coupled to the taps, to examine the corresponding delayed versions of the filtered input signal to affect the generation of the feedback signal with the examination results. In one embodiment, the novel receiver is employed in a network interface controller. In yet another embodiment, the novel network interface controller is employed in a computer system.

23 Claims, 3 Drawing Sheets

RECEIVER HAVING A COMPARATOR BASED DECISION FEEDBACK EQUALIZER

BACKGROUND OF THE INVENTION

1. Field of the Invention

The present invention relates to the fields of data networking and digital communication. More specifically, the present invention relates to adaptive or feedback channel equalizers employed in receivers of network interface controllers (NIC) or digital communication terminals.

2. Background Information

Recent advances in microprocessor and communication technology have led to increasing number of computers and other digital devices (such as, printers, scanners and so forth) being networked together. Computers and other digital devices of close proximity to one another are networked together locally through a local area network (LAN), which in turn are networked with other locally networked remote computers/digital devices by internetworking the LANs via wide area networks (WAN).

Notwithstanding the great advances in networking technology, to-date, the popularity and success in networking computers and other digital devices together are still substantially confined to the work place, where the networking environment is typically a well controlled environment (in terms of control attenuation, delay, echo and so forth). Networking computers and peripherals together in the home remains a challenge, as economics dictate that the networking be accomplished in a less controlled environment, using existing power lines or phone lines, as called for by industry initiatives such as the CEBus and Anypoint Networking, and with low cost components.

Typically, computers and digital devices are networked together using network interfaces (also referred to as network from the network interface controllers, NIC for short). Included in each NIC is at least one receiver or transceiver (hereinafter, simply receiver) to receive or recover signals from the networking medium. Most receivers include adaptive channel equalizers (also referred to as feedback channel equalizers), which are used to compensate time variant channel characteristics, to minimize the interference between the symbols of digital signal.

Among the various digital equalizers, decision feedback equalizer is one of the most popular. Prior art decision feedback equalizers are typically constituted with feed forward and feedback sections having similar constructions that are multipliers based. In other words, both sections, feed forward and feedback, are provided with multiple multipliers to correspondingly modify the delayed versions of the equalizer input and output signals respectively.

Multipliers are inherently complex, and therefore account for a large portion of the real estate and cost of a receiver ASIC equipped with such an adaptive or feedback channel equalizer. Thus, an improved decision feedback equalizer that contributes to reducing the cost of receiver ASICs and in turn, the cost of NICs and networking enabled digital devices, is desired.

SUMMARY OF THE INVENTION

A novel receiver having a decision feedback equalizer is disclosed. The decision feedback equalizer is equipped with a feedback section to generate a feedback signal. The feedback section includes a plurality of taps to successively delay a filtered version of an input signal of the decision feedback equalizer. The feedback section further includes a plurality of comparators, correspondingly coupled to the taps, to examine the corresponding delayed versions of the filtered input signal to affect the generation of the feedback signal with the examination results.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as receivers, transmitters and so forth. As well understood by those skilled in the art, these operations are often accomplished through storing, transferring, combining, or otherwise manipulating electrical, magnetic, and/or optical signals.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
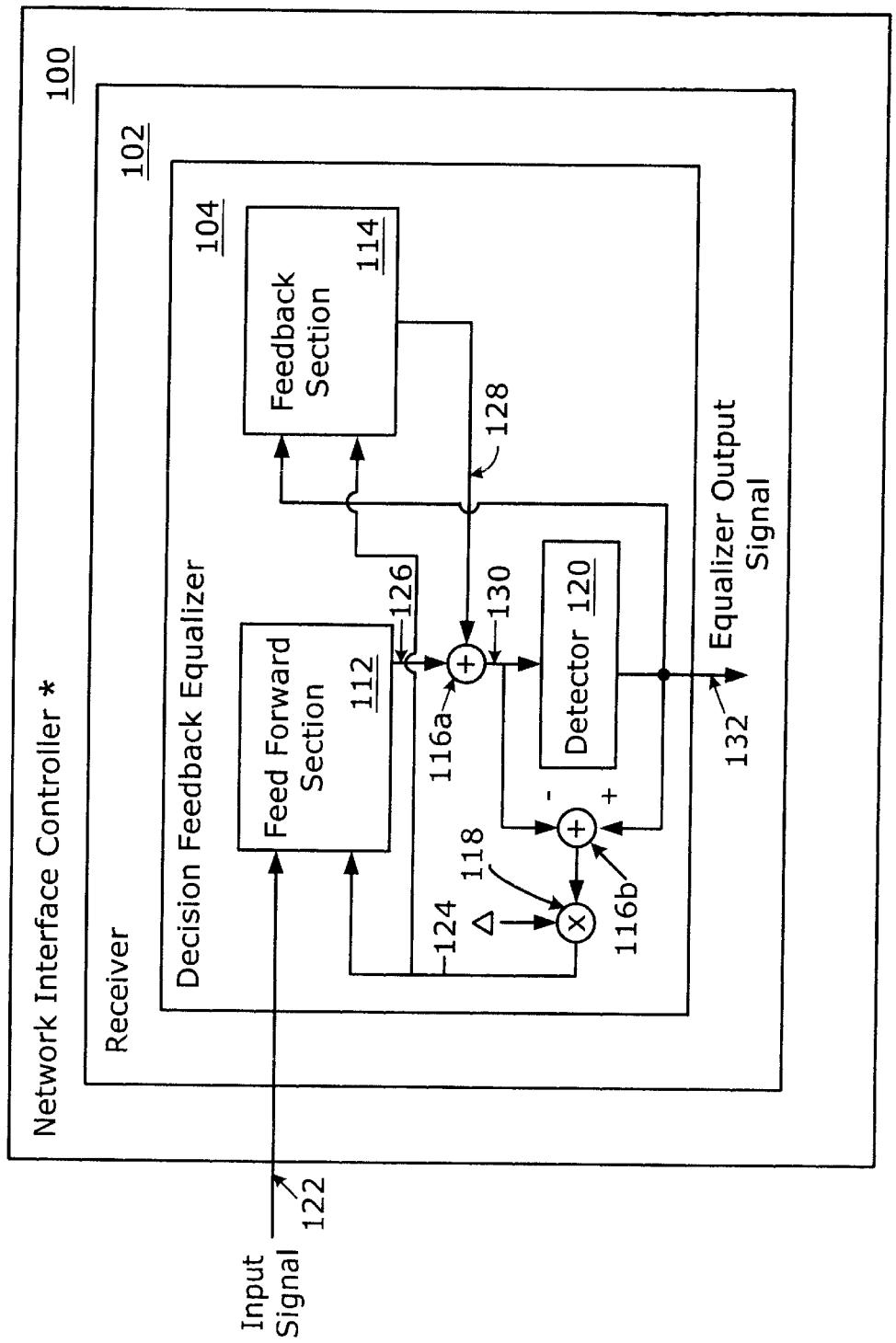
FIG. 1 illustrates an overview of the present invention.

Referring now to FIG. 1, wherein an overview of the present invention is shown. As illustrated, receiver 102 of network interface card 100 is provided with decision feedback equalizer 104 incorporated with the teachings of the present invention. More specifically, decision feedback equalizer 104 includes feed forward section 112, feedback section 114, adders 116a–116b, multiplier 118, and detector 120, coupled to each other as shown, where in accordance with the present invention, feedback section 114 is comparator based feedback section (as opposed to multiplier based as in the prior art).

Feed forward section 112 receives input signal 122 (to receiver 102) from an external source, and filtering coefficient step-size signal 124 from multiplier 118, as inputs, and outputs filtered signals 126 in response. Adder 116a adds feedback signals 128 to filtered signals 126 to generate equalizer output signal 130. Detector 120 receives equalizer output signal 130 as input, and generates quantized equalizer output signal 132 as output. Additionally, quantized output signal 132 is provided to feedback section 114 along with filtering coefficient signal 124 to generate feedback signals 128, as well as to adder 116b along with output signal 130 to generate differential signal 134 for multiplier 118. Multiplier 118 multiplies differential signal 134 by an empirically predetermined constant to generate step-size coefficient signal 124.

Except for the teachings of the present invention incorporated in feedback section 114, feed forward section 112, feedback section 114, adders 116a–116b, multiplier 118 and detector 120 are all otherwise intended to represent a broad range of these elements known in the art. The term receiver as used herein is intended to include standalone receivers as well as integrated receivers such as transceivers. Network interface card 100 is intended to cover network interface controllers of all forms, including but not limited to the forms of an add-on card, a PCMCIA card, a PC card, and a single integrated circuit. Network interface card 100 may be disposed in any one of a number of digital apparatus, including but not limited to a computer system, a set-top box, a router, a hub, a switch, a gateway and a wireless modem.

Figure 2:
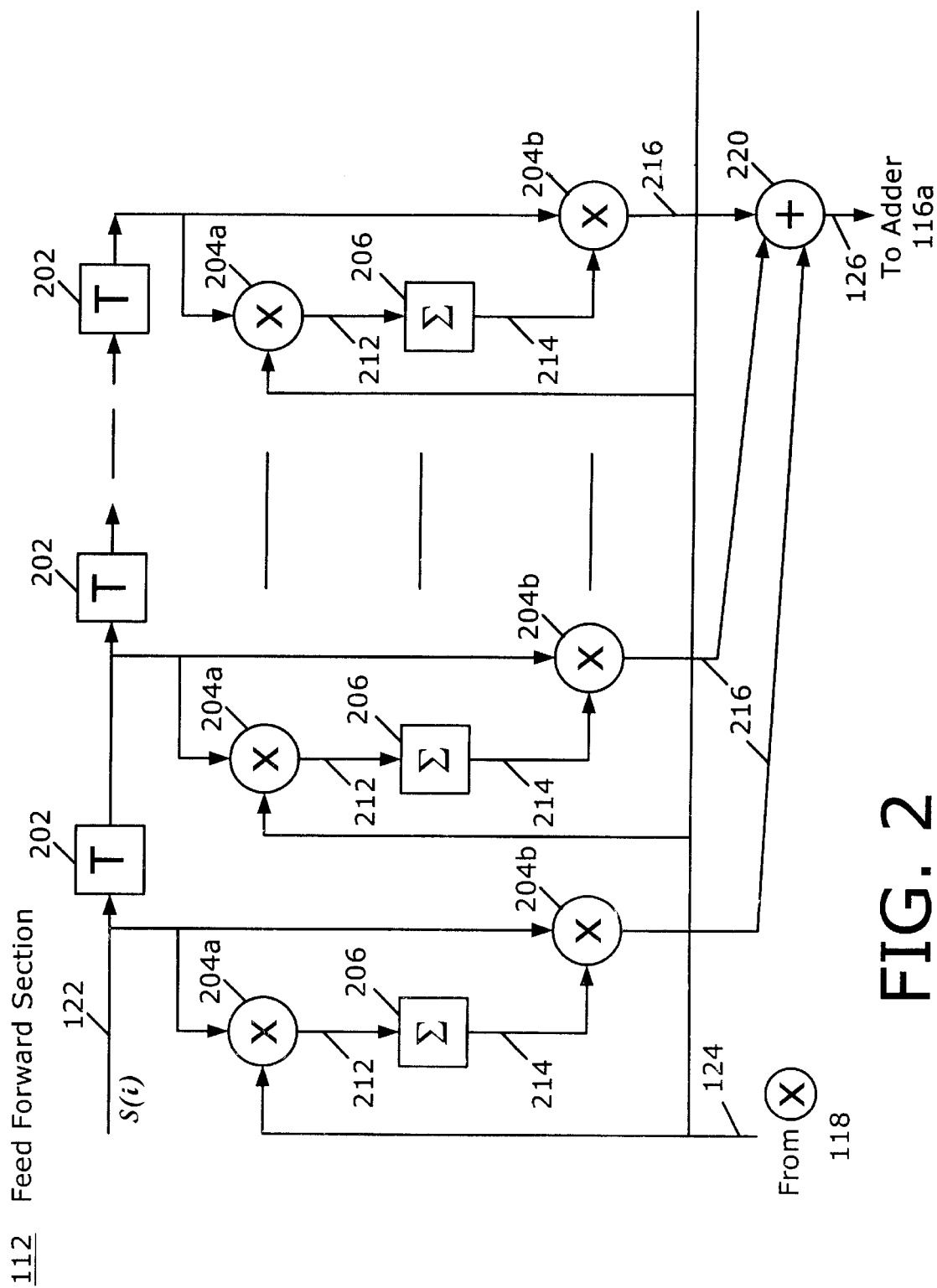
FIG. 2 illustrates the feed forward section in further detail in accordance with one embodiment.

Although feed forward section 112 is intended to represent a broad range of such element known in the art, to aid in the understanding of the novel modifications made to feedback section 114, one embodiment of feed forward section 112 will nevertheless be described with reference to FIG. 2. For the illustrated embodiment, feed forward section 112 includes taps 202, multipliers 204a–204b, accumulators 206, and adder 220, coupled to each other as shown. Taps 202 are employed to successively delay input signal 122 as part of the filtering process. At each delay stage, i.e. each tap, the corresponding "delayed" version of input signal 122 is provided to the corresponding multipliers 204a and 204b. [At stage "zero", i.e. the first stage, no delay has occurred yet.] In any event, at each corresponding multiplier 204a, the corresponding "delayed" version of input signal 122 is multiplied by coefficient signal 124 (which incidentally, changes for each "iteration", upon modified by equalizer's output signal 130). The resulting product signal 212 is provided to the corresponding accumulator 206, which accumulates the resulting product value. At each "iteration", each current accumulated value 214 is provided to its corresponding multiplier 204b, allowing the corresponding "delayed" version of input signal 122 to be multiplied by the corresponding current accumulated value. The resulting product signals 216 are then added together by adder 220 to form filtered signal 126 of FIG. 1.

Figure 3:
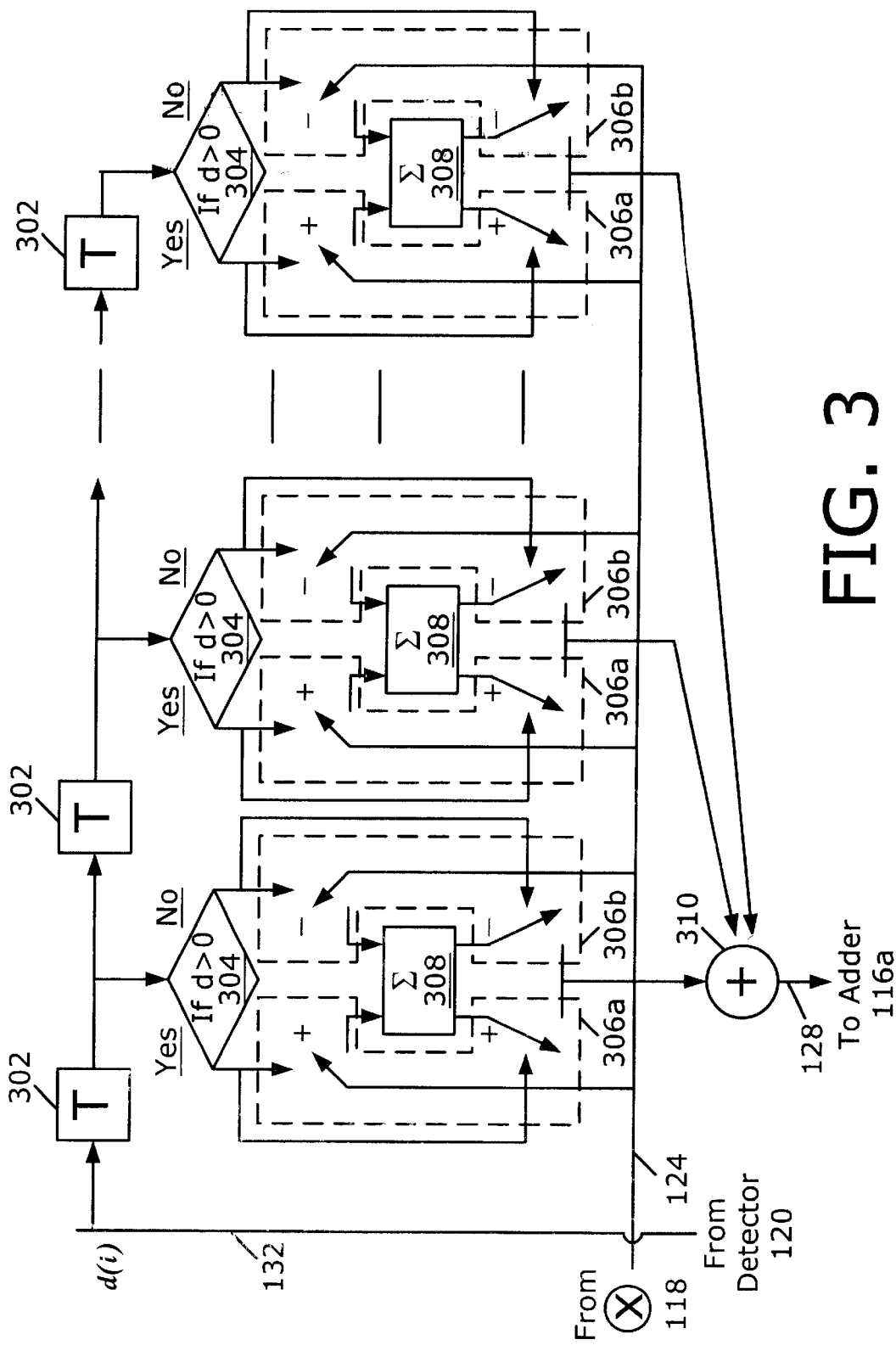
FIG. 3 illustrates the feedback section in further detail in accordance with one embodiment.

Referring now to FIG. 3, wherein a block diagram illustrating feedback section 114 of FIG. 1 in further detail in accordance with one embodiment is shown. As illustrated, feedback section 114 includes taps 302, comparators 304, switch pairs 306a–306b, accumulator 308, and adder 310, coupled to each other as shown. In other words, unlike prior art feedback section, which is substantially the same as the feed forward section, accordingly multiplier based, feedback section 114 of receiver 102 of the present invention is comparator based. The conventional multipliers are replaced by comparators 304 and switch pairs 306a–306b.

Taps 302 are employed to successively delay output signal 132 as part of the feedback signal generation process. At each delay stage, i.e. each tap, the corresponding "delayed" version of output signal 132 is provided to the corresponding comparator 304. [At stage "zero", i.e. the first stage, no delay has occurred yet.] In any event, at each corresponding comparator 304, the corresponding "delayed" version of output signal 132 is examined to determine if its value is positive or negative. The signal reflecting the result of the determination is used to control the corresponding switch pair 306a or 306b. That is if the corresponding "delayed" version of output signal 132 is determined to be positive, switch pairs 306a are closed, allowing coefficient signal 124 to be accumulated by the corresponding accumulator 308, and the current output of accumulator 308 to be sent to adder 310. On the other hand, if the corresponding "delayed" version of output signal 132 is determined to be negative, switch pairs 306b are closed, allowing coefficient signal 124 to be removed from the accumulated value by the corresponding accumulator 308, and the negative of the current output of accumulator 308 to be sent to adder 310. The resulting current accumulated values of accumulators 308 (positives and negatives) are added together to form feedback signal 128, using adder 310.

As those skilled in the art will appreciate that the comparator-switch pair approach represents a significant real estate savings over the prior art multiplier approach (especially when a large number of the delay stages is involved). Accordingly, under the present invention, a much smaller and more cost effective receiver, and network interface controller may be built.

Conclusion

From the foregoing description, those skilled in the art will recognize that many other variations of the present invention are possible. Thus, the present invention is not limited by the details described, instead, the present invention can be practiced with modifications and alterations within the spirit and scope of the appended claims. Accordingly, a novel receiver having a comparator based decision feedback equalizer has been described.

What is claimed is:

1. A receiver comprising:
   a decision feedback equalizer having a feedback section to generate a feedback signal, the feedback section including
   a plurality of taps to successively delay a filtered version of an input signal of the decision feedback equalizer, and
   a plurality of comparators correspondingly coupled to the taps to examine the corresponding delayed versions of the filtered input signal, wherein each comparator to determine if its delayed version of the filtered input signal represents a positive value or a negative value in order to generate the feedback signal for the decision feedback equalizer.

2. A receiver comprising:
   a decision feedback equalizer having a feedback section to generate a feedback signal, the feedback section including
   a plurality of taps to successively delay a filtered version of an input signal of the decision feedback equalizer,
   a plurality of comparators correspondingly coupled to the taps to examine the corresponding delayed versions of the filtered input signal to generate examination results; and
   a plurality of adders/subtractors correspondingly coupled to the comparators, each adder/subtractor to add or subtract a coefficient signal from a plurality of accumulator values based on the examination result of the corresponding comparator in order to generate the feedback signal for the decision feedback equalizer.

3. The receiver of claim 2, wherein each adder/subtractor to add the coefficient signal to a corresponding accumulator value if the examination result of the corresponding comparator indicates that the corresponding delayed version of the filtered input signal represents a positive value.

4. The receiver of claim 2, wherein each adder/subtractor to subtract the coefficient signal from a corresponding accumulator value if the examination result of the corresponding comparator indicates that the corresponding delayed version of the filtered input signal represents a negative value.

5. A receiver comprising:
a decision feedback equalizer having a feedback section to generate a feedback signal, the feedback section including
a plurality of taps to successively delay a filtered version of an input signal of the decision feedback equalizer, and
a plurality of comparators correspondingly coupled to the taps to examine the corresponding delayed versions of the filtered input signal; and
a plurality of adders/subtractors correspondingly coupled to the comparators to output a plurality of accumulator values based on the examination result from the corresponding comparator in order to generate the feedback signal for the decision feedback equalizer.

6. The receiver of claim 5, wherein each adder/subtractor to output a positive version of a corresponding accumulator value if the examination result of the corresponding comparator indicates that the corresponding delayed version of the filtered input signal represents a positive value.

7. The receiver of claim 5, wherein adder/subtractor to output a negative version of a corresponding accumulator value if the examination result of the corresponding comparator indicates that the corresponding delayed version of the filtered input signal represents a negative value.

8. An apparatus comprising:
a receiver having a decision feedback equalizer equipped with a feedback section to generate a feedback signal, the feedback section including
a plurality of taps to successively delay a filtered version of an input signal of the decision feedback equalizer, and
a plurality of comparators correspondingly coupled to the taps, each comparator to determine if its corresponding delayed version of the filtered input signal represents a positive value or a negative value in order to determine whether to accumulate a corresponding coefficient signal to generate the feedback signal for the decision feedback equalizer.

9. An apparatus comprising:
a receiver having a decision feedback equalizer equipped with a feedback section to generate a feedback signal, the feedback section including
a plurality of taps to successively delay a filtered version of an input signal of the decision feedback equalizer, and
a plurality of comparators correspondingly coupled to the taps to examine the corresponding delayed versions of the filtered input signal, each comparator to determine whether the corresponding delayed version of the filtered input signal represents a positive or negative value; and
a plurality of adder/subtractors correspondingly coupled to the comparators, each adder/subtractor to add a corresponding coefficient signal to a corresponding accumulator value if its corresponding comparator has determined that the corresponding delayed version of the filtered input signal represents a positive value and to subtract the corresponding coefficient signal from the corresponding accumulator value if its corresponding comparator has determined that the corresponding delayed version of the filtered input signal represents a negative value, in order to generate the feedback signal for the decision feedback equalizer.

10. The apparatus of claim 9, wherein each adder/subtractor comprises a switch pair to switch based on the determination of the corresponding comparator in order to allow the corresponding coefficient signal to be accumulated or removed from the corresponding accumulator value based on whether the corresponding delayed version of the filtered input signal represents a positive or negative value.

11. The apparatus of claim 9, further comprising an adder coupled to the plurality of adders/subtractors to add together all the accumulator values from the adders/subtractors to generate the feedback signal for the decision feedback equalizer.

12. An apparatus comprising:
a receiver having a decision feedback equalizer equipped with a feedback section to generate a feedback signal, the feedback section including
a plurality of taps to successively delay a filtered version of an input signal of the decision feedback equalizer, and
a plurality of comparators correspondingly coupled to the taps to examine the corresponding delayed versions of the filtered input signal, each comparator to determine whether the corresponding delayed version of the filtered input signal represents a positive or negative value; and
a plurality of adder/subtractors correspondingly coupled to the comparators, each adder/subtractor to output a positive version of a corresponding accumulator value if the corresponding comparator determines that the corresponding delayed version of the filtered input signal represents a positive value and to output a negative version of the corresponding accumulator value if the corresponding comparator determines that the corresponding delayed version of the filtered input signal represents a negative value, in order to generate the feedback signal for the decision feedback equalizer.

13. The apparatus of claim 12, wherein each adder/subtractor comprises a switch pair to switch based on the determination of the corresponding comparator in order to allow a positive or negative version of the corresponding accumulator value to be output based on whether the corresponding delayed version of the filtered input signal represents a positive or negative value.

14. The apparatus of claim 12, further comprising an adder coupled to the plurality of adders/subtractors to add together all the positive and negative accumulator values output by the adders/subtractors to generate the feedback signal for the decision feedback equalizer.

15. A network interface controller comprising:
a receiver having a decision feedback equalizer equipped with a feedback section to generate a feedback signal, the feedback section including
a plurality of taps to successively delay a filtered version of an input signal of the decision feedback equalizer, and
a plurality of comparators correspondingly coupled to the taps to examine the corresponding delayed versions of the filtered input signal and to determine whether the corresponding delayed version of the filtered input signal represents a positive or negative value in order to generate the feedback signal for the decision feedback equalizer, wherein the network interface controller has a form factor selected from a group consisting of an add-on card, a PCMCIA card, a PC card, and an ASIC.

16. An apparatus comprising:

a processor; and a network interface controller coupled to the processor and an external networking medium, the network interface controller including a receiver having a decision feedback equalizer equipped with a feedback section to generate a feedback signal, the feedback section including a plurality of taps to successively delay a filtered version of an input signal of the decision feedback equalizer, and a plurality of comparators correspondingly coupled to the taps to examine the corresponding delayed versions of the filtered input signal, wherein each comparator to determine if its delayed version of the filtered input signal represents a positive value or a negative value, in order to generate the feedback signal for the decision feedback equalizer.

17. An apparatus comprising:

a processor; and a network interface controller coupled to the processor and an external networking medium, the network interface controller including a receiver having a decision feedback equalizer equipped with a feedback section to generate a feedback signal, the feedback section including a plurality of taps to successively delay a filtered version of an input signal of the decision feedback equalizer, and a plurality of comparators correspondingly coupled to the taps to examine the corresponding delayed versions of the filtered input signal and to determine whether the corresponding delayed version of the filtered input signal represents a positive or negative value; and a plurality of adders/subtractors correspondingly coupled to the comparators to add or subtract a coefficient signal from a plurality of accumulator values based on the corresponding comparator's determination as to whether the corresponding delayed version of the filtered input signal represents a positive or negative value, in order to generate the feedback signal for the decision feedback equalizer.

18. The apparatus of claim 17, wherein each adder/subtractor to add the coefficient signal to a corresponding accumulator value if the corresponding delayed version of the filtered input signal has been determined to represent a positive value.

19. The apparatus of claim 17, wherein each adder/subtractor to subtract the coefficient signal from a corresponding accumulator value if the corresponding delayed version of the filtered input signal has been determined to represent a negative value.

20. An apparatus comprising:

a processor; and a network interface controller coupled to the processor and an external networking medium, the network interface controller including a receiver having a decision feedback equalizer equipped with a feedback section to generate a feedback signal, the feedback section including a plurality of taps to successively delay a filtered version of an input signal of the decision feedback equalizer, and a plurality of comparators correspondingly coupled to the taps to examine the corresponding delayed versions of the filtered input signal and to determine whether the corresponding delayed version of the filtered input signal is a positive or negative value; and a plurality of adder/subtractors correspondingly coupled to the comparators, each adder/subtractor to output a positive version of a corresponding accumulator value if the corresponding delayed version of the filtered input signal is determined to be a positive value and to output a negative version of a corresponding accumulator value if the corresponding delayed version of the filtered input signal is determined to be a negative value, in order to generate the feedback signal for the decision feedback equalizer.

21. The apparatus of claim 20, wherein each adder/subtractor comprises a switch pair to switch based on the determination of the corresponding comparator in order to allow a positive or negative version of the corresponding accumulator value to be output based on whether the corresponding delayed version of the filtered input signal is a positive or negative value.

22. The apparatus of claim 20, further comprising an adder coupled to the plurality of adders/subtractors to add together all the positive and negative accumulator values output by the adders/subtractors to generate the feedback signal for the decision feedback equalizer.

23. An apparatus comprising:

a processor; and a network interface controller coupled to the processor and an external networking medium, the network interface controller including a receiver having a decision feedback equalizer equipped with a feedback section to generate a feedback signal, the feedback section including a plurality of taps to successively delay a filtered version of an input signal of the decision feedback equalizer, and a plurality of comparators correspondingly coupled to the taps to examine the corresponding delayed versions of the filtered input signal and to determine whether the corresponding delayed version of the filtered input signal represents a positive or negative value in order to generate the feedback signal for the decision feedback equalizer, wherein the apparatus is a selected one from a group consisting of a computer system, a set-top box, a router, a hub, a switch, a gateway and a wireless modem.

* * * * *